Sept. 3, 1929. E. C. H. VALE Re. 17,422
PROCESS FOR EXTRACTING THE PURE CELLULOSE FROM THE BAGASSE OF SUGAR CANE
Original Filed Aug. 9, 1926
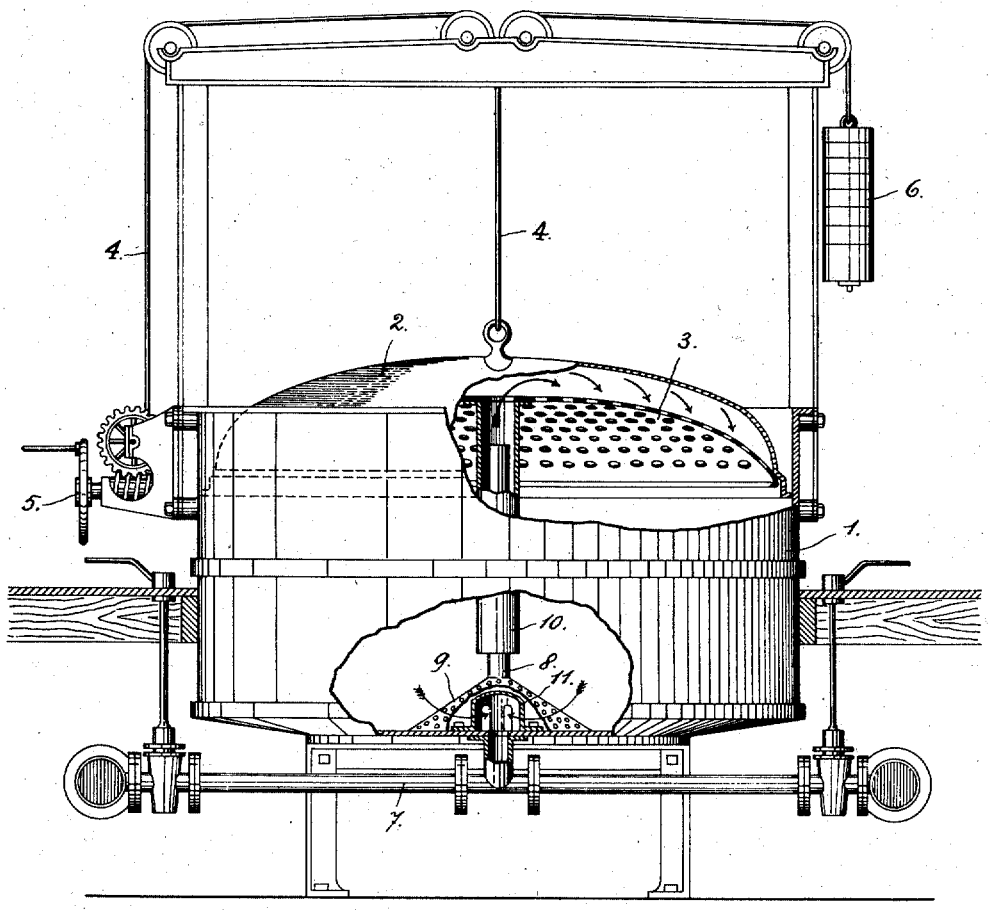
Inventor
Earnest Charles Jemmer Vale
By B. Singer, Atty.

Reissued Sept. 3, 1929.

Re. 17,422

UNITED STATES PATENT OFFICE.

EARNEST CHARLES HEMMER VALET, OF MEXICO, MEXICO, ASSIGNOR TO CELULOSA HEMMER VALET, SOCIEDAD AMONIMA, OF MEXICO, MEXICO, A CORPORATION OF MEXICO.

PROCESS FOR EXTRACTING THE PURE CELLULOSE FROM THE BAGASSE OF SUGAR CANE.

Original No. 1,630,147, dated May 24, 1927, Serial No. 128,305, filed August 9, 1926, and in Mexico June 14, 1926. Application for reissue filed May 22, 1929. Serial No. 365,222.

The present invention refers to a process and apparatus for extracting and separating cellulose from the bagasse of sugar cane, in order to utilize this cellulose in the manufacture of paper, cardboard and similar products.

The invention has for its object to provide a simple and inexpensive process by which the cellulose pulp may be manufactured at the place where the sugar cane is grown and crushed, and from where it may be sent in a compressed form to the factories which convert it into paper, cardboard and similar products.

The principal difficulty encountered up to this date in the separation of the pure cellulose from the bagasse of the sugar cane consisted in obtaining a thorough elimination of the saccharose remaining in the bagasse after crushing, and of the resinous and other components of the stalks. A sufficiently complete elimination of all foreign matters is accomplished by the process described hereinafter.

The sugar cane, before or after it has passed through the mill, is cut by adequate machinery into lengths of about one inch and carried by conveyors to the macerating tanks wherein takes place the first step of the process. The cane mill may also be connected directly with the macerating tanks which are of a suitable construction and provided with an agitating mechanism, and the macerating liquid may be heated by exhaust steam.

The macerating tanks which, as already mentioned may be located at a certain distance from the mills, or adjacent to the same, are filled with a clear solution of lime, which solution may be prepared by adding from about three to five parts of unslaked lime to 100 parts of water, agitating and permitting the undissolved lime to settle and the bagasse is left to remain in this solution during a variable time which depends upon the system of tanks used and upon the temperature of the solution, which temperature, however, should not reach the boiling point.

As soon as the object of this first treatment has been obtained, which is to eliminate certain components of the bagasse which may be an obstacle to its subsequent treatment, the lime solution is drawn off for separate and independent treatment for other products, and the bagasse without being washed is carried to cooking tanks especially constructed for obtaining a sufficiently pure cellulose. In case the bagasse has not been cut up into small lengths before being subjected to the treatment with the lime solution, this may be done now before introducing it into the cooking tanks.

In the accompanying drawing is shown a preferred form of a cooking tank used for carrying out the present process. As will be seen from this drawing, a round tank 1 is provided with two covers 2 and 3, preferably fastened together along their edges. These covers may be raised by means of cables 4 or chains moved by a crank 5, and are further provided with a counterweight 6. The lower cover 3 is perforated over its entire surface and less curved than the upper cover 2, so as to leave an open space between both covers. Instead of the covers 2 and 3 being united, they may also be placed separately one above the other, but the upper cover should fit tightly into the side walls of the tank 1. The cooking apparatus is provided with suitable piping 7 for admitting either direct or indirect steam.

The cooking tanks are filled as high as possible with the bagasse taken out of the macerating tanks, and with a liquid consisting of a solution of about 6% of caustic soda and of a solution of from 2 to 3% of sodium sulphite, in the proportion of about 18 gallons of the caustic soda solution and 12 gallons of the sodium sulphite solution, making 30 gallons of both solutions combined, for every 100 pounds of dry bagasse. The composition of the liquid may further be varied by adding additional clear lime solution, according to the class of bagasse to be treated, which varies with its age and the place where it has been grown. In some cases there may also be used a weak solution of calcium sulphite, reducing proportionally the amount of sodium sulphite solution. Instead of sodium sulphite, sodium hypo-sulphite may also be used.

When the cooking tanks have been filled with the bagasse and with the solutions already described and determined according to the properties and compositions of the bagasse, steam is admitted to the tank through the pipe 7, and the bagasse is cooked at a pressure of from 7 to 8 pounds and during 4 to 6 hours which is sufficient time to secure the greatest possible purity of the cellulose.

The perforated cover 3, through its own weight and the additional weight of the upper cover 2, presses down on the bagasse during the whole cooking process, in order that the bagasse may not be revolved in the tank by the inrushing steam and by the circulating solution, but will stay quiet without moving. This is an essential part of the process, as otherwise the percentage of pure cellulose obtained would be greatly diminished. The solution however is continually forced through the mass of the bagasse, being pushed up by the entering steam through a vertical pipe 8 which rests on a perforated cone 9 provided at the bottom of the tank and over the steam inlet; from there the solution overflows as indicated by arrows into the space between the two covers 2 and 3, and enters the tank again through the holes of the lower cover. After passing downward through the bagasse, it is sucked in again by the incoming steam through the perforated cone 9 and into the pipe 8. This pipe is partly surrounded by a wider tube 10 connected with the lower cover 3, and on top of the steam inlet there is placed a hood 11 having a number of openings, which serves to divert the steam laterally so that it may push before it the solution which enters through the cone 9 and raise it through the pipe 8.

After the cooking process is finished, the solution is drawn off and fresh steam is admitted which washes the cellulose remaining in the tank and cleans it of all the dissolved substances. The pure cellulose is then taken out and placed in suitable tanks, to be bleached with chlorine, chlorides or similar substances, or it may also be bleached electrically.

After bleaching the cellulose may be sent to paper making machines of any system, according to the class of paper, cardboard, etc., to be made; the bagasse cellulose pulp may either be used alone or mixed with pulp from other materials.

What I claim is:

1. A process for extracting the pure cellulose from the bagasse of sugar cane, which consists in first treating the bagasse with a solution of lime, in boiling it afterwards under pressure in a solution of about 6% of caustic soda combined with a solution of 2 to 3% of sodium salts until, all the foreign matter has been dissolved and separated from the cellulose, in cleaning the cellulose thus obtained with fresh steam after having drawn off the solutions, and in bleaching the pure cellulose.

2. A process for extracting the pure cellulose from the bagasse of sugar cane, as set forth in claim 1, including the step of cutting up the bagasse into small pieces before it undergoes a treatment in boilers.

3. A process for extracting the pure cellulose from the bagasse of sugar cane, which consists in macerating the bagasse in a solution of lime contained in a heated tank provided with agitators, in boiling it under pressure in a solution of caustic soda and a solution of sodium salts, in a proportion of about 18 gallons of caustic soda solution and 12 gallons of sodium salts solution to every 100 pounds of dry bagasse, in separating with a current of fresh steam the dissolved foreign matter from the pure cellulose, and in bleaching the pure cellulose with chlorine, chlorides or electrically.

4. A process for extracting the pure cellulose from the bagasse of sugar cane, as set forth in claim 3, including the step of adding to the solutions of caustic soda and of sodium salts a solution of lime in a proportion of about 12 gallons to every 100 pounds of dry bagasse.

5. A process for extracting the pure cellulose from the bagasse of sugar cane, as set forth in claim 3, wherein to the solutions of caustic soda and of sodium salts during the second step of the process, is added a weak solution of calcium sulphite, reducing eventually the quantity of sodium salts employed.

6. A process for extracting cellulose from the bagasse of sugar cane, which consists in first treating the bagasse with a substantially clear lime solution, in boiling it afterwards in a solution containing caustic soda and a sulphite of sodium, in cleaning the cellulose thus obtained with fresh steam after having drawn off the solutions and in bleaching the cellulose.

7. A process for extracting cellulose from the bagasse of sugar cane, which comprises first treating the bagasse with a substantially clear lime solution, and thereafter heating the same in a caustic solution containing a sulphite of sodium.

8. The process according to claim 7 wherein agitation of the bagasse during the heating in the caustic and sulphite solution is prevented.

9. The process for extracting cellulose from the bagasse of sugar cane, which comprises cutting the bagasse into small pieces, then treating it with a substantially clear lime solution and thereafter boiling it in a solution containing caustic soda and a sulphite of sodium.

10. A process for extracting cellulose from the bagasse of sugar cane which comprises first cutting the bagasse into small pieces, then adding to the bagasse a substantially clear lime solution and heating the mixture with steam while maintaining the temperature below the boiling point, then separating the fibres from the solution and thereafter boiling in a caustic and sulfite solution.

11. A process for extracting cellulose from the bagasse of sugar cane, which comprises macerating the bagasse in a substantially clear solution of lime contained in a heated tank provided with agitators, in boiling it under pressure in a solution of caustic soda and sodium sulphite, in separating with a current of fresh steam the dissolved foreign matter from the cellulose, and in bleaching the cellulose with chlorine, chlorides or electrically.

In testimony whereof, I have signed my name to this specification.

EARNEST CHARLES HEMMER VALET.